Feb. 16, 1971    J. B. DUGUAY    3,562,954
PIVOTALLY SUPPORTED WINDOWS
Filed Aug. 21, 1968    3 Sheets-Sheet 1

INVENTOR.
JOHN B. DUGUAY

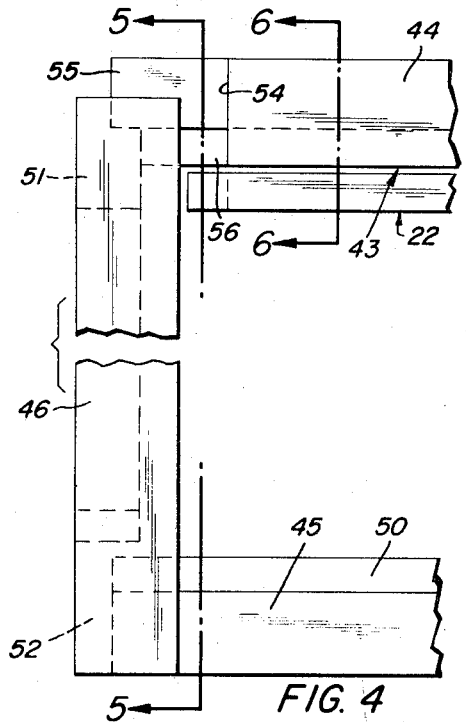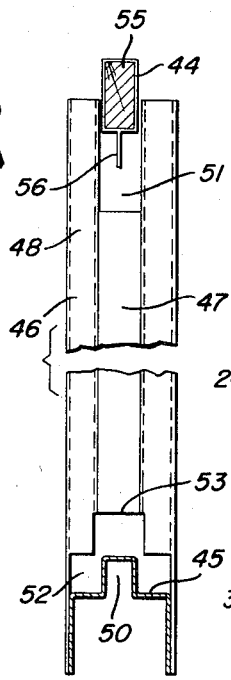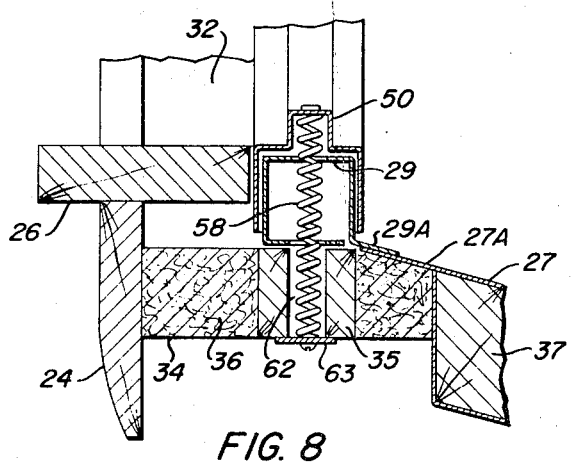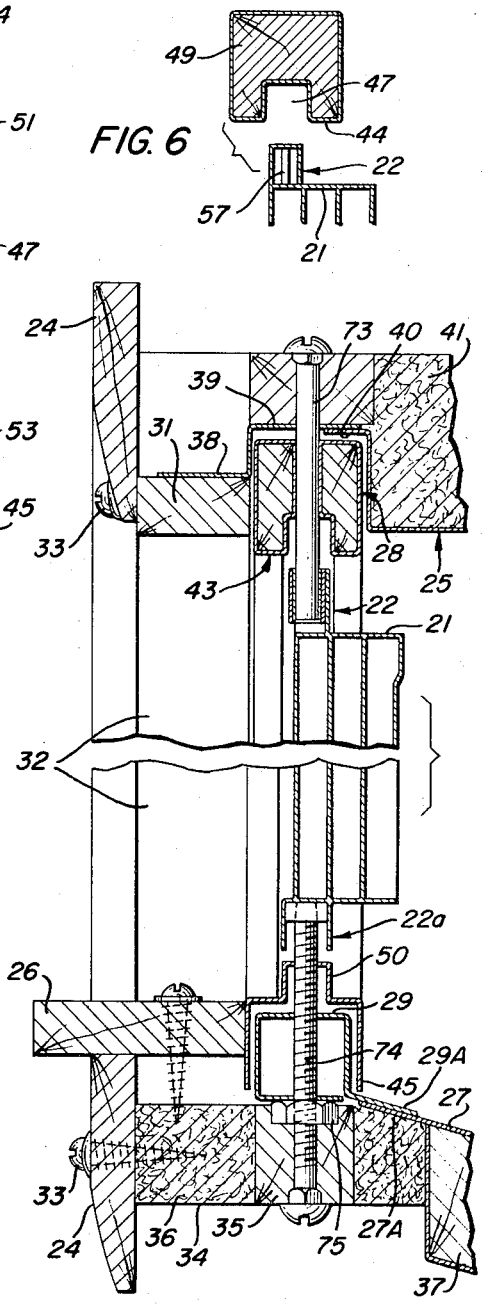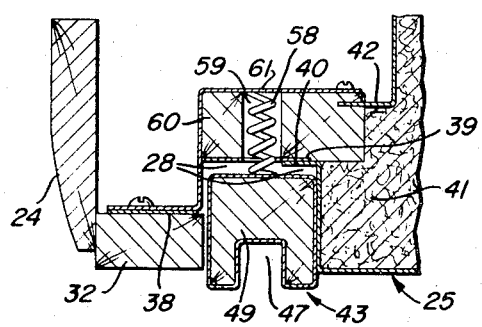
INVENTOR.
JOHN B. DUGUAY

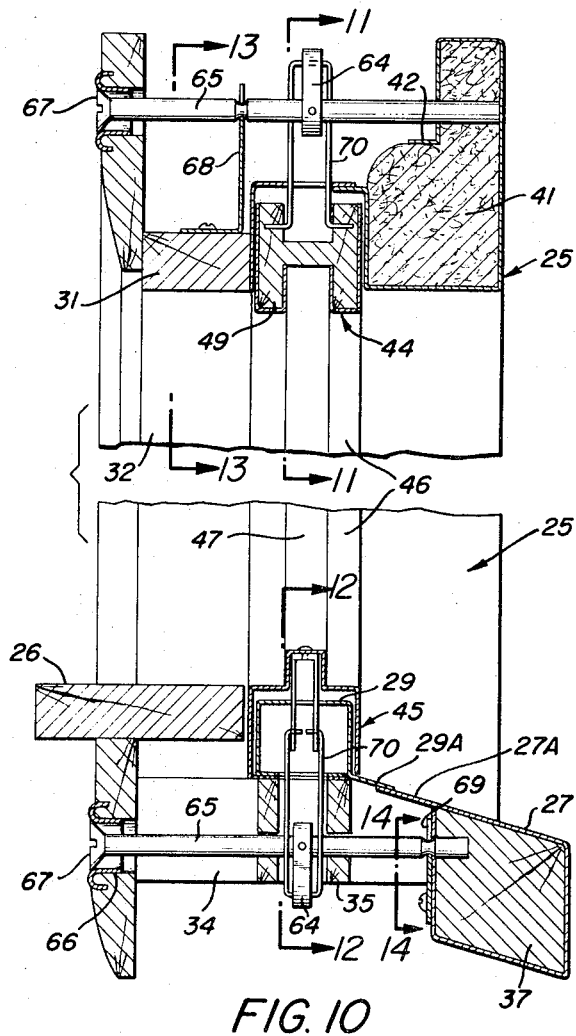

United States Patent Office
3,562,954
Patented Feb. 16, 1971

3,562,954
PIVOTALLY SUPPORTED WINDOWS
John B. Duguay, 37 Garand St.,
Waterville, Maine 04901
Filed Aug. 21, 1968, Ser. No. 754,394
Int. Cl. E06b 7/20
U.S. Cl. 49—318                                   5 Claims

ABSTRACT OF THE DISCLOSURE

Windows are disclosed that are pivotally supported by casing structure so that they may be swung to bring their outer faces into a position wherein they may be serviced from within the building with releasable means holding the windows against being so turned.

Figure 1:
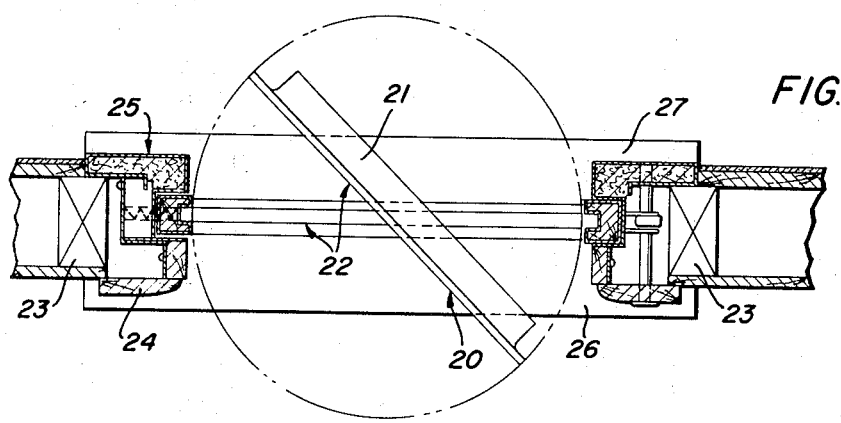

The present invention relates to pivotally supported windows and to releasable holding means therefor.

It is commonly recognized that the cleaning of the outer faces of windows is difficult and often hazardous particularly in the case of tall buildings. Several proposals have been made to solve the problems by pivotally supporting windows so that they could be turned to position their outer faces for washing or other servicing from within the building.

These proposals have not been accepted because the means by which the windows were to be held against being pivoted prevented the windows from being suitably sealed against the weather.

The principal objective of the present invention is to provide pivoted window installations that are free from objections of that type, an objective that it attained with windows having marginal portions in a vertical plane and with the window casing structure having holding and sealing means movable between window holding and releasing positions and with release means in control of the holding means.

Another objective of the invention is to provide holding means in the form of a frame that has a weather sealing relation to the marginal portions of the window in the closed position of the holding means.

Another objective of the invention is to have the holding means normally yieldably held in sealing engagement with the window.

In the accompanying drawings, there is shown an illustrative embodiment of the invention from which these and other of its objectives, novel features, and advantages will be apparent.

Figure 2:
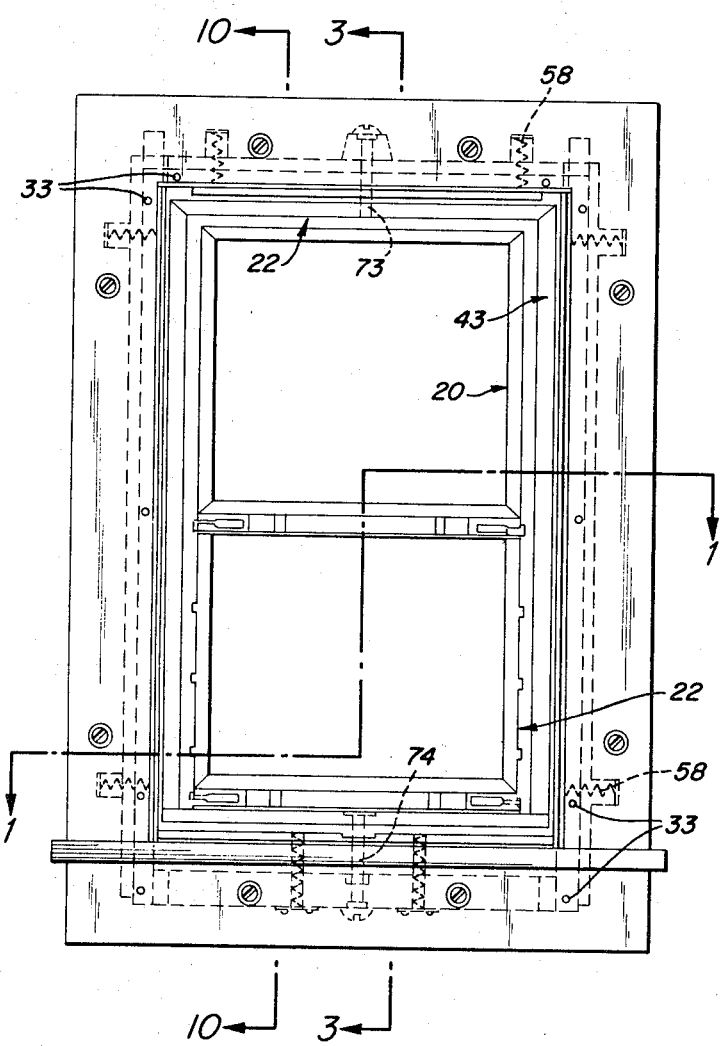
Figure 3:
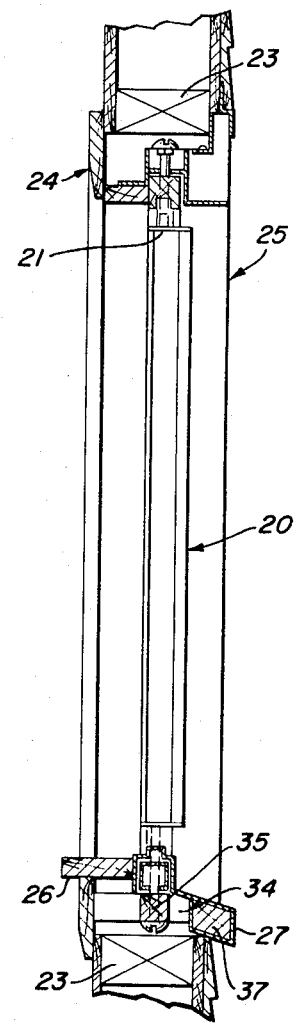

In the drawings:

FIG. 1 is a transverse section of a window installation in accordance with the invention taken substantially along the indicated lines 1—1 of FIG. 2, FIG. 2 is a view of the installation as seen from the inside of the building, FIG. 3 is a section taken approximately along the indicated lines 3—3 of FIG. 2, FIG. 4 is a fragmentary view, on an increased scale of the holding frame, FIGS. 5 and 6 are sections taken approximately along the indicated lines 5—5 and 6—6, respectively, of FIG. 4, FIG. 7 is a fragmentary vertical section taken along approximately the lines 3—3 of FIG. 2 but on an increased scale, FIG. 8 is a fragmentary, vertical section through the ledges showing one of the springs in control of the bottom member of the holding frame, FIG. 9 is a like view of a spring in control of one of the other members of the holding frame, FIG. 10 is a section taken approximately along the indicated lines 10—10 of FIG. 2 showing the release means for the top and bottom members of the holding frame, FIG. 11 is a fragmentary section taken approximately along the indicated lines 11—11 of FIG. 10, FIG. 12 is a like view taken approximately along the indicated lines 12—12 of FIG.10, FIG. 13 is a view taken approximately along the indicated lines 13—13 of FIG. 10, and FIG. 14 is a view taken approximately along the indicated lines 14—14 of FIG. 10.

In the embodiment of the invention illustrated by the drawings, the window, generally indicated at 20 is more or less conventional, three track, combination aluminum window. The track for such a window is in the casing 21 and, in accordance with the invention, the casing 21 has an outwardly disposed, planar attaching frame 22 shown as being in the form of a channel extending along all four of its sides, and being in the form of a downwardly opening channel 22A along the bottom of the window, see FIG. 7.

The window opening is shown as defined by framework 23, see FIGS. 1 and 3, supporting an inner frame, generally indicated at 24, and an outer frame, generally indicated at 25. The frames 24 and 25 include inner and outer ledges 26 and 27, respectively, and they are also interconnected by structure providing generally indicated side and top channels 28 and a bottom rib 29 shown as hollow.

In the embodiment of the invention illustrated by the drawings, such structure includes a marginal frame consisting of interconnected top and side members indicated at 31 and 32, respectively, and connected to the inner frame 24 by screws 33 and, at their lower ends, by cross supports 34 extending between the bottom of the frame 24 and the outer ledge 27. A supporting member 35 extends between the cross supports 34 and the spaces between it and the outer ledge 27 and the bottom of the inner frame 24 are indicated as being filled with suitable insulation 36. The outer ledge 27 is a metal shell having a reinforcement 37 and extends inwardly as at 27A with the rib 29 having a flange 29A overlying it.

Each of the members 31 and 32 is connected to the outer frame 25 as by a strip 38, see FIGS. 7 and 8, secured to it and including an offset flange 39 to which is anchored the offset flange 40 extending lengthwise of the appropriate part of the outer frame 25 thus to form the channels 28. The frame 25 is shown as a shell filled with insulation indicated at 41 and as including a side flange 42 parallel to but spaced from each side flange 40.

A receiving frame is generally indicated at 43 and includes, see FIGS. 4, 5, and 6, top, bottom, and side members 44, 45, and 46, respectively. The top and side members 44 and 46 fit the appropriate channels 28 and have channels 47 centrally of their inner walls dimensioned to receive corresponding sides of the frame 21. The members 44 and 46 may be reinforced as at 49. The bottom member 45 receives within it the rib 29 and includes a rib 50 to fit within the bottom channel 22A of the frame 21.

The frame 43 is expansible from its window gripping and sealing position and to this end, each of the side members 46 has its channel 47 terminate short of its upper end to provide a slot 51 and its wall 48 terminates short of its lower end to provide an open end 52 to receive the ends of the bottom member 45 with the channel 47 cut back to provide a notch 53 for the rib 50. The top member 44 has shoulders 54 providing ends 55 dimensioned to fit the slots 51. With this arrangement, the members of the frame 43 remain engaged when the frame has been expanded to be free of the attaching frame 22. It will be noted, see FIG. 4, that the ends 55 of the top member 44 have depending fins 56 disposed and dimensioned to enter slots 57 in the upper corners of the attaching frame 22 thus to provide an effective weather seal.

The frame 43 is yieldably held in its holding position by means of springs 58, see FIG. 9, bearing against each of its members. The springs 58 for the side and top members of the frame 43 are confined in bores 59 in blocks 60 secured by a bracket 61 to the appropriate marginal frame and to the flange 42 of the outer frame 25. The bottom springs 58 are confined in bores 62 in the member 35 and closed by bottom plates 63 and extend freely upwardly through the rib 29 into contact with the undersurface of the rib 50 as may be seen in FIG. 8.

In order to expand the frame 43 against the action of the springs 58, cranks 64 are provided, two being used for each member of the frame 43 in the embodiment of the invention illustrated by the drawings, see FIGS. 10–12. The cranks 64 are mounted on shafts 65 which extend freely through sleeves 66 in the inner frame 24 in which their kerfed heads 67 are rotatably exposed. The shafts 65, in the case of those for the sides and top members of the frame 43, are supported by the outer frame 25 and by keepers 68 secured to the appropriate member of the inner frame, the member 31 in FIG. 10. The shafts 65, in the case of the bottom member 45 are supported by the supporting member 35 and by keepers 69 mounted on the inner face of the ledge 27. Each crank 64 is connected to a member of the frame 43 by a link 70 which is so bent that its pivotal connection 71 between the link and the crank passes from one side to the other of a plane through the axis of the shaft and the pivotal connection 72 of the link and the frame member. As shown in FIGS. 11 and 12, the turning of the shafts 65 is limited by the engagement of the links therewith and the frame is held in its expanded position against the action of the springs.

When the frame 43 is in its expanded position, the window 20 is free with the exception of its pivots 73 and 74, see FIG. 7. These are centrally located and vertically aligned so that the window 20 can be turned to bring its outer surface within the building to enable it to be easily cleaned or otherwise serviced. It will be noted that the lower pivot 74 is in the form of a bolt extending upwardly through the supporting member 35 with a nut 75 threaded thereon to prevent vertical movement of the pivot.

From the foregoing, it will be appreciated that the frame 43 is effective to provide an effective weather seal but may be easily and quickly retracted to so release the window 21 that it may be turned to bring its outer face in a position in which it may be serviced from the interior of the building.

I claim:

1. In a window installation, window casing structure, a window, means connecting said window to said structure to enable it to be so turned as to permit its outer surface to be serviced from inside, means connected to the structure including frame-establishing portions sealing the margins of the window against the weather and holding the window against being turned and portions slidably supporting said frame portions for movement inwardly from their window sealing and holding position into a position releasing the window, and window releasing means comprising at least one crank for each frame member and including a shaft supported by the structure, a link for each crank, a first link pivot connecting one link end to the associated frame member, a second link pivot connecting the other end of the link to the crank, each link including portions so angularly disposed that the second link pivot may pass from one side to the other of a plane inclusive of the crank pivot and the first link pivot then to maintain the frame member in its retracted position.

2. The window installation of claim 1 in which each shaft has a kerfed end exposed on the inner surface of the casing structure.

3. The window installation of claim 1 in which the connecting means are vertically aligned pivots supported by the casing structure and the bottom pivot engages the bottom of the sash to hold it in a predetermined vertical position.

4. In a window installation, window casing structure including top and side planar channels and a bottom rib, the rib and channels being co-planar, a window, means connecting said window to said structure to enable it to be so turned as to permit its outer surface to be serviced from inside, a frame including top and side members, each within an appropriate channel, and a bottom member in the form of a channel receiving said rib, said members being movable between exposed operative and retracted releasing portions, said frame members and the sash of the window including complemental tongue and groove portions interfitting to seal the window against the weather and to hold the window against being turned, and window releasing means carried by the structure and connected to the frame members for moving them into and of their operative position, said frame members including slidably interfitted ends maintaining the members in a frame establishing relationship in both positions.

5. The window installation of claim 4 in which there are springs, at least one for each frame member and in engagement therewith, said springs being backed by the casing structure and operable to urge the frame members into their operative positions, and the slidably interfittings ends of the frame members including stop portions mutually engageable to limit the extent to which the frame members may be moved by said springs.

References Cited

UNITED STATES PATENTS

| | | | |
|---|---|---|---|
| 2,889,591 | 6/1959 | Pratt | 49—390 |
| 2,977,646 | 4/1961 | Flaherty | 49—390X |
| 3,252,255 | 5/1966 | Marpe | 49—318 |

FOREIGN PATENTS

| | | | |
|---|---|---|---|
| 542,901 | 1/1942 | Great Britain | 49—317 |
| 521,534 | 8/1953 | Belgium | 49—317 |

J. KARL BELL, Primary Examiner

U.S. Cl. X.R.

49—392